J. H. COFFEY & J. H. COFFEY, Jr.
PROCESS OF MOLDING AND VULCANIZING TIRES.
APPLICATION FILED MAR. 23, 1915.

1,166,326.

Patented Dec. 28, 1915.

WITNESSES.
N. R. Tyndall
E. P. Hall

INVENTORS.
J. H. Coffey.
J. H. Coffey, Jr.
BY J. Edward Maybee
ATTY

UNITED STATES PATENT OFFICE.

JOSEPH HERBERT COFFEY AND JOSEPH HERBERT COFFEY, JR., OF TORONTO, ONTARIO, CANADA, ASSIGNORS OF ONE-HALF TO GUTTA PERCHA AND RUBBER, LIMITED, OF TORONTO, CANADA.

PROCESS OF MOLDING AND VULCANIZING TIRES.

1,166,326. Specification of Letters Patent. Patented Dec. 28, 1915.

Application filed March 23, 1915. Serial No. 16,369.

*To all whom it may concern:*

Be it known that we, JOSEPH HERBERT COFFEY and JOSEPH HERBERT COFFEY, Jr., of the city of Toronto, in the county of York, Province of Ontario, Canada, subjects of the King of Great Britain, have invented certain new and useful Improvements in Processes of Molding and Vulcanizing Tires, of which the following is a specification.
In ordinary practice tires are vulcanized in molds either partial or complete, which renders it necessary in order to avoid too great an expenditure for molds to reduce the time of curing as much as possible. Experience has shown that long curing is preferable to give durability to the tire, and our object is to devise a process of molding which will enable us to vulcanize in the open and thus give as much time as may be necessary for vulcanizing without tying up molds from their proper function in the shaping and forming of tires.

We attain our object by molding the tires on a suitable core and in a sectional removable mold. The tread surface of the tire is molded first, the sections of the tread portion of the mold being moved radially to compress the tire against the tread portion of the core and draw the sides adjacent the tread toward the rim side. The sides adjacent the rim are pressed against the mold and stretched from the tread, the edges being also drawn away from the tread and inwardly toward each other. The edges and the parts of the sides adjacent thereto are then held on the core while the tread portion of the mold is removed radially. The sides are then released and finally the tire is cured in a suitable vulcanizer either exposed or buried in powdered soapstone.

The process is carried out in detail substantially as hereinafter more specifically described and by means of apparatus such as illustrated in the accompanying drawings in which—

Figure 1:
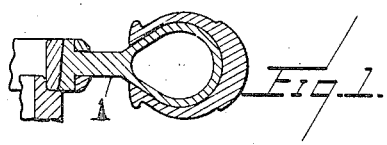
Figure 2:
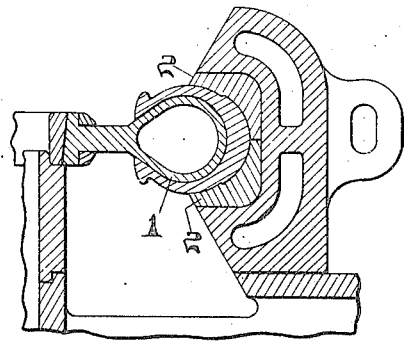
Figure 3:
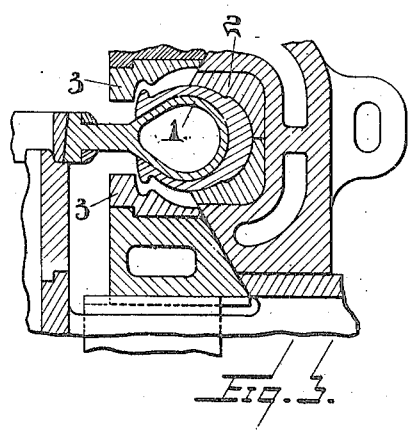
Figure 4:
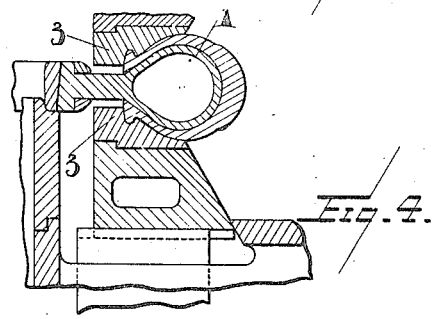
Figure 5:
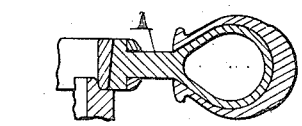
Figure 6:
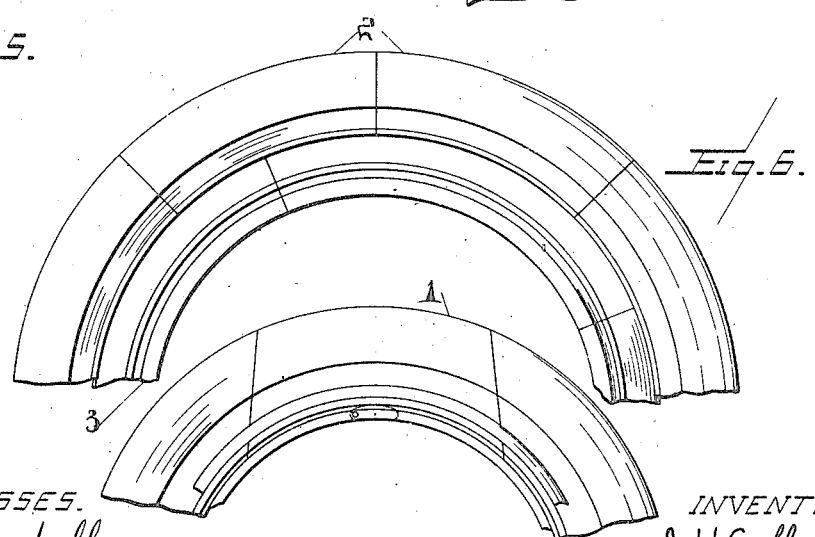

Figure 1 is a sectional view illustrating the first step in the process; Fig. 2 a similar view showing the second step; Fig. 3 a similar view showing the third step; Fig. 4 a similar view showing the fourth step; Fig. 5 a similar view showing the completely molded tire on the core ready for removal; and Fig. 6 a plan view showing parts of the core, tread portion of the mold and one of the side portions of the mold.

In the drawings like numerals of reference indicate corresponding parts in the different figures.

In carrying out our process, the tire is first built up according to ordinary methods on a suitable core 1, which may be of any ordinary construction, though we prefer to use the sectional core shown and described in our Patent No. 1,154,843, dated September 28, 1915. The next step is to compress the tread portion of the tire against the core and to draw the portions of the side walls with the tire adjacent the tread toward the rim side of the tire. This is effected by means of the tread mold segments 2, which are readily movable and so proportioned that the edges thereof will extend substantially to the middle of the side walls of the tire when the mold has been moved forward sufficiently to properly mold the tread of the tire. The next step is to mold and compress the edges or beads of the tire and the side walls adjacent thereto. This is effected by means of the sectional side molds 3, which are moved not only toward the side walls, but at the same time away from the tread, the actual movement being on a diagonal line inclined toward the rim side of the tire. To enable this movement to be effectively performed, the adjacent sides of the side molds 3 and the tread mold 2 are cut as shown on a bevel. When the tire is first formed, the edges thereof are somewhat closer to the tread portion of the tire than the corresponding portions of the side molds are to the tread portions of the mold, when the side molds and tread molds are in the position shown in Fig. 4 with the tire completely molded. The consequence is that as the side molds are moved to position pressing the side walls and edges of the tire against the core the edges and side walls adjacent thereto are stretched and smoothly drawn around the core. This completes the smoothing out and stretching of the side walls, which is commenced by the inward radial movement of the sections of the tread mold. The purpose of this is to thoroughly stretch and smooth down the canvas fabric of the tire carcass so as to prevent wrinkles or bulges therein, these wrinkles or bulges being a fruitful cause of blow-outs. After the side molds have been moved up to complete the molding of the side walls and the edges, they are securely retained in place in any suitable manner and the tread mold removed. The sides and edges of the tire being securely held, the tread mold comes away without distorting the uncured tire. After the tread mold has been removed, the side molds are withdrawn and removed.

It will be found that the tire, owing to the method of molding employed, is in such condition that it can then be easily cured in the open in any suitable vulcanizer, the mold being then available for molding another tire. In this way the molds may be employed all day in molding tires, which may be subsequently allowed to cure all night.

If the saving of molds is not a special consideration the tires might be cured in the molds, all the other advantages of our invention remaining.

As the tread portion of a mold is by far the most expensive part, a considerable saving is effected even if the tires be cured with the side molds in place, and in some cases it may be desirable to retain them.

The cores will usually be sectional, as integral cores can only be used for small sizes of tires owing to the difficulty of removing them.

What we claim as our invention is:—

1. A process of molding and vulcanizing tires which consists in molding the tire on a suitable core and in a sectional mold, removing the tread portion of the mold radially while still holding the edges and the adjacent portions of the sides of the tire against the core, then releasing the sides and edges of the tire, and finally vulcanizing the molded tire in any suitable manner.

2. A process of molding and vulcanizing tires which consists in molding the tire on a suitable core and in a sectional mold, and in the process of molding stretching the sides and edges in a direction away from the tread, removing the tread portion of the mold radially while still holding the edges and the adjacent portions of the sides of the tire against the core, then releasing the sides and edges of the tire and finally vulcanizing the molded tire in any suitable manner.

3. A process of molding and vulcanizing tires which consists in molding the tire on a core and in the process of molding stretching the sides and edges in a direction away from the tread by pressure applied adjacent the edges to displace said edges and increase the cross-sectional circumference of the tire, and subsequently vulcanizing the tire.

4. A process of molding and vulcanizing tires which consists in positioning the tire on a core; applying a molding pressure to the tread and part of the sides of the tire in a direction normal to the tread; applying a molding and side-stretching pressure to the edges and portions of the sides adjacent thereto in a diagonal direction toward the core to displace said edges and increase the cross-sectional circumference of the inner periphery of the tire and subsequently vulcanizing the tire.

5. A process of molding and vulcanizing tires which consists in molding the tire on a core and in the process of molding stretching the sides and edges in a direction away from the tread by pressure applied adjacent the edges, and subsequently removing the mold and vulcanizing the tire.

6. A process of molding and vulcanizing tires which consists in positioning the tire on a core, applying a molding pressure to the tread and part of the sides of the tire in a direction normal to the tread, applying a molding and side stretching pressure to the edges and portions of the sides adjacent thereto in a diagonal direction toward the core, and subsequently releasing and vulcanizing the tire.

7. A process of molding and vulcanizing tires which consists in molding the tire on a suitable core in a sectional mold with radially movable sections, then removing the mold radially, and finally vulcanizing the tire.

Signed at Toronto, Canada, this 26th day of Feb., 1915, in the presence of the two undersigned witnesses.

JOSEPH HERBERT COFFEY,
JOSEPH HERBERT COFFEY, Junior.

Witnesses:
J. Edw. Maybee,
H. M. Christman.